United States Patent Office 2,842,524
Patented July 8, 1958

2,842,524

CROSS-LINKED PERHALOGENATED DICARBOXYLIC ACIDS AND METHOD OF PREPARATION THEREOF

Ralph L. Herbst, Jr., Westfield, and Billy F. Landrum, Belleville, N. J., assignors, by mesne assignments, to Minnesota Mining and Manufacturing Company, St. Paul, Minn., a corporation of Delaware No Drawing. Application November 22, 1954
Serial No. 470,526

4 Claims. (Cl. 260—77.5)

This invention relates to the products prepared by reacting the dicarboxylic acids with a linking agent such as a polyisocyanate or a polymercaptan.

The perfluorochlorodicarboxylic acids which are reacted in accordance with the process of the invention may be prepared in a variety of ways. For example, they may be prepared by subjecting perhalogenated aliphatic diolefins, having at least 7 carbon atoms and being at least half fluorinated, to oxidation conditions in the presence of a vigorous oxygen-containing oxidizing agent, such as free oxygen in the presence of ultraviolet light, free oxygen in the presence of ultraviolet light and elemental chlorine, free oxygen in the presence of elemental fluorine, and permanganate salts in a liquid medium. Preparation of the dicarboxylic acids according to these methods is disclosed in copending application Serial No. 452,706, filed August 27, 1954.

The dicarboxylic acids may also be prepared by subjecting aliphatic perhalogenated high polymers to thermal cracking conditions, thereby producing lower molecular weight materials in the oil and wax range and subjecting the lower molecular weight materials to oxidation at a temperature not higher than about 10° C. in the presence of a permanganate salt in a liquid medium. Processes of this type are disclosed in copending application, Serial No. 452,704, filed August 27, 1954.

Another process for the preparation of perfluorochlorocarboxylic acids useful in the present invention comprises treating fluorine-containing telomers having the formula

in which M is a perhalomethyl radical having a total atomic weight not higher than 146.5, $X_1$ and $X_2$ are fluorine or chlorine, and $n$ is an integer from 2 to 16, with fuming sulfuric acid at a temperature of at least 125° C. This process produced dicarboxylic acids having the general formula

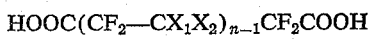

in which $X_1$ and $X_2$ are fluorine or chlorine and $n$ is an integer from 2 to 16. Processes of this type are disclosed in copending application Serial No. 452,703, filed August 27, 1954, now U. S. Patent 2,806,865.

Dicarboxylic acids useful in the process of the invention may also be prepared by hydrolysis of other telomers such as that produced by telomerizing perhaloolefins using sulfuryl chloride as a telogen, these telomers having the formula

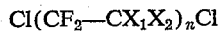

in which $X_1$ and $X_2$ are fluorine or chlorine atoms and $n$ is an integer from 2 to 16. Hydrolysis of these telomers with fuming sulfuric acid produces dicarboxylic acids having the formula

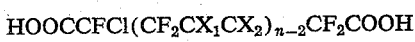

in which $X_1$, $X_2$ and $n$ are as given above. Preparation of the dicarboxylic acids according to this process is disclosed in copending application Serial No. 452,705, filed August 27, 1954, now U. S. Patent 2,806,866. The preferred perfluorochlorodicarboxylic acids cross-linked in accordance with the process of the invention are those having 6 to 30 carbon atoms prepared by the sulfuric acid hydrolysis of the telomerization product of chlorotrifluoroethylene and sulfuryl chloride.

Among the linking agents which may be used are diisocyanates and polyisocyanates, such as p-phenylene diisothiocyanate, triphenylmethane triisocyanate, p-phenylene diisocyanate, p,p'-diphenylmethane diisocyanate, m-tolylene diisocyanate, hexamethylene diisocyanate, ethylene diisocyanate, and 1,3,5-phenylenetriisocyanate.

Polymercaptans may also be employed, such as the aliphatic mercaptans having the general formula,

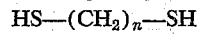

wherein $n$ is an integer between 2 and 20 inclusive, and preferably between 4 and 12; and the aromatic mercaptans. Illustrative of the aliphatic mercaptans are tetramethylene dimercaptan, hexamethylene dimercaptan and decamethylene dimercaptan.

Reacting the dicarboxylic acids in accordance with the present invention produces thermosetting resins, and the linking may be effected by heating a mixture of a perfluorochlorodicarboxylic acid and a polyisocyanate or polymercaptan cross-linking agent at a temperature between room temperature and about 200° C. The concentration of linking agent used is generally between about 0.01 and 100 parts by weight per 100 parts by weight of perfluorochlorodicarboxylic acid, and is preferably between about 1.0 and 75 parts by weight per 100 parts by weight of perfluorochlorodicarboxylic acid.

The heating may be continued for a period of a few minutes to 10 days, preferably 0.1 hour to 24 hours, under a pressure of 0.1 mm. Hg absolute to 5000 p. s. i. g. The preferred pressures which may be used are those ranging between 0.1 mm. Hg absolute and atmospheric pressure inasmuch as the removal of solvent and volatile reaction products, such as carbon dioxide and water, is readily accomplished in vacuo.

The reaction is desirably effected in the presence of a solvent or diluent, and the polyisocyanate or polymercaptan linking agent is generally mixed with the solvent and added to the perfluorochlorodicarboxylic acid. The solvent or diluent may be used in a quantity corresponding to about 50 to 500 parts by weight per 100 parts of the perfluorochlorodicarboxylic acid, and exemplary solvents or diluents include carbon tetrachloride, fluorotrichloromethane, difluorodichloromethane, 1,1,2-trifluorotrichloroethane, benzotrifluoride, dichlorobenzotrifluoride, carbon disulfide, and methylenedichloride.

The thermosetting resins produced by reacting the perfluorochlorodicarboxylic acids in accordance with the invention are useful as protective coating resins, impregnating agents, and binders, since they are chemically inert and chemically stable. The technique of applying these resins to a surface does not necessitate fusion or a high temperature technique which is necessary in applying polychlorotrifluoroethylene, for example, as a coating. One example of the use of the thermosetting resins of the invention is as follows: The article which is to be coated is dipped into the mixture comprising the fluorochloro diacid, linking agent and solvent. The mixture is then heated until the article is coated with a viscous layer of resin. Although the solvent may be removed completely by air-drying, the drying time is greatly accelerated by the application of heat. By this relatively simple procedure a variety of shaped articles, including very intricate apparatus, is coated with the thermosetting resins of the invention. Dispersions of the resins can also be applied to metal surfaces by conventional spraying or brushing techniques.

The resins are adaptable to the covering of metallic surfaces to produce coatings which are smooth, resistant to abrasion, and which have improved resistance to strong and corrosive chemicals, such as strong acids and alkalies, as compared to the halogen-free and less highly fluorinated thermosetting resins. Ingredients such as plasticizers, pigments and finely divided metals may be incorporated into the resin with advantage during its manufacture.

The resins of the invention are also useful as electrical insulators having low moisture absorption, high heating resistance, high strength, chemical resistance, permanence, and which are non-flammable.

The invention will be further illustrated by reference to the following specific examples in which all parts are by weight:

Example 1

100 parts by weight of a perfluorochlorodicarboxylic acid having the formula

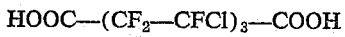

$$HOOC-(CF_2-CFCl)_3-COOH$$

were reacted with 45 parts of triphenylmethane triisocyanate having the structural formula

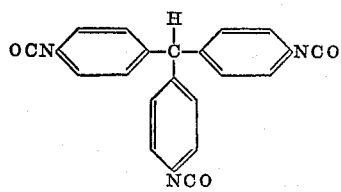

in 205 parts of methylene dichloride solvent by warming the mixture gently at atmospheric pressure to a temperature of 40–50° C. for a period of about 15 minutes. The product was a reddish-purple colored solid having a melting point in excess of 300° C. and being insoluble in boiling 3,5-dichlorobenzotrifluoride. The yield was 90 percent by weight, based upon the weight of perfluorochlorodicarboxylic acid charged.

Example 2

100 parts by weight of a perfluorochlorodicarboxylic acid having the formula

$$HOOC-(CF_2-CFCl)_4-COOH$$

are reacted with 35 parts of hexamethylene dimercaptan in 250 parts of carbon tetrachloride solvent by warming the mixture gently at atmospheric pressure to a temperature of 70–80° C. for a period of 20 minutes. The product is a solid which is insoluble in benzotrifluoride.

It will be obvious to those skilled in the art that many modifications may be made within the scope of the present invention without departing from the spirit thereof, and the invention includes all such modifications.

We claim:

1. A process which comprises reacting a perfluorochlorodicarboxylic acid having the formula:

$$HOOCCFCl(CF_2CFCl)_{n-2}CF_2COOH$$

in which $n$ is an integer from 2 to 16 with an organic polyisocyanate.

2. A process according to claim 1 in which the organic polyisocyanate is triphenylmethane triisocyanate having the formula:

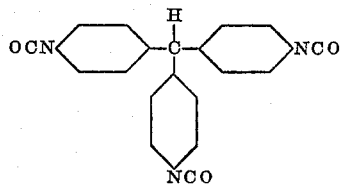

3. A process which comprises reacting a straight chain, aliphatic perfluorochlorodicarboxylic acid having between 6 and 30 carbon atoms per molecule and having repeating units of —$(CF_2-CFCl)$— with an organic polyisocyanate.

4. A process which comprises reacting a perfluorochlorodicarboxylic acid having the formula:

$$HOOC(CF_2-CFCl)_{n-1}CF_2COOH$$

in which $n$ is an integer from 2 to 16 which comprises reacting the acid with an organic polyisocyanate.

References Cited in the file of this patent

UNITED STATES PATENTS

| Number | Name | Date |
|---|---|---|
| 2,268,586 | Gilman | Jan. 6, 1942 |
| 2,527,374 | Patrick et al. | Oct. 24, 1950 |
| 2,559,752 | Berry | July 10, 1951 |
| 2,606,206 | Guenthner | Aug. 5, 1952 |